April 21, 1959

N. H. BEK 2,883,516

RESISTANCE WELDING EQUIPMENT

Filed May 27, 1957

INVENTOR.
NORBERT H. BEK
BY *Whittemore, Hulbert & Belknap*
ATTORNEYS

April 21, 1959

N. H. BEK 2,883,516

RESISTANCE WELDING EQUIPMENT

Filed May 27, 1957

INVENTOR.
NORBERT H. BEK
BY Whittemore Hulbert
Belknap
ATTORNEYS

# United States Patent Office 2,883,516
Patented Apr. 21, 1959

2,883,516

RESISTANCE WELDING EQUIPMENT

Norbert H. Bek, Detroit, Mich.

Application May 27, 1957, Serial No. 661,725

11 Claims. (Cl. 219—89)

The present invention relates to improvements in resistance welding apparatus, and more particularly, to press-type or related types of machinery, for example, multipoint welders, for projection or spot welding. It will be evident to those skilled in the art that the principle of the invention is quite widely applicable to this sort of equipment, hence the expressions "press-type," and the like should be broadly construed.

It is a general object of the invention to provide an improved resistance welding unit in the form of an electrode adapter, holder, base or anvil equipped with a curent conducting spring device to improve the weld made by welding machines of the types described.

Another object is to provide a very simple and inexpensive unit or device to achieve fast follow-up in the welding operation.

A further and more specific object is to provide improved spring-type electrode mounting provisions in which an electrode holder or adapter member of generally conical axial cross section holds an electrode and conducts electric current at relatively high amperage. The holder or adapter member in question is fabricated of a suitable alloy possessing a suitable combination of electrical conductivity and elasticity. In accordance with the invention, an adapter of this type, when operated in the resistance welding machine, traps and stores spring energy as it holds the electrode's surface in contact with the work under welding pressure. It yields or deflects under that pressure to maintain substantially constant force on the workpiece as the constraint on the electrode lessens, as a result of the metal of the workpiece being softened by the weld current.

In accordance with optional embodiments, a spring cone holder of the invention may be applied to either or both of the moving press head and stationary base or platen members of the welding machine; and other possible adaptations of the principle of the invention will also suggest themselves.

Speaking of its advantages, a general object of the invention is to provide an electrode holder or adapter, preferably of conical spring type as described, which improves a projection or spot weld by insuring substantially uniform and constant welding pressure as the electrodes engage the work, heat the same and follow it to final welding condition, i.e., a fast follow-up. Possible defacement of the work under undue electrode pressure prior to heating and mushrooming of electrode tips are prevented, due to cushioning of the initial impact of the electrodes on the work.

Further, contacting surfaces of the work need not be exactly parallel or at a precise right angle to the electrode axis, inasmuch as the spring electrode structure allows variations in deflection to correct alignment. By the same token, the spring accommodates non-uniform projection weld heights, without requiring separate application of the electrode pressure at each projection point. Accordingly, the follow-up speed permitted by the improvement permits welding at lower pressure settings and at lower amperage. Comparatively large size welds on relatively thick material can be performed by a given size welding machine.

It is also a simple matter to water cool the spring device, if desired.

Other objects and features of the invention will become apparent as the description proceeds, especially when taken in conjunction with the accompanying drawings, wherein.

Figure 1:
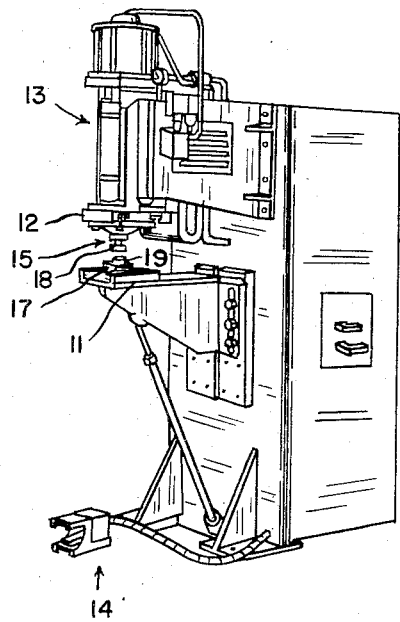
Fig. 1 is a perspective view of a standard press-type resistance welding machine equipped with the improved electrode holder device according to one embodiment of the invention.

Referring first to Figs. 1 through 5 of the drawings, the reference numeral 10 generally designates a standard industrial resistance welding machine of the vertical press type, featuring a fixed lower electrode base or platen 11, and a vertically movable upper press head 12 powered by a suitable hydraulic or like fluid pressure actuated unit, generally designated 13, the press being controlled by pedal operated electric or equivalent means, generally designated 14. All of these features are entirely conventional and constitute no part of my invention, hence are not further illustrated or described.

As embodied in the structure of Figs. 1 through 5, a single electrode holder or adapter 15 of the invention is employed, this member being rigidly secured, as by bolts 16, on the upper press head 12. A conventional coacting electrode holder 17 is fixed mounted on the lower base or platen 11. Appropriately formed resistance welding electrodes 18, 19 are mounted in an electrically conductive way on the respective holders 15 and 17 in a manner to be described; and the holders are electrically energized to energize the electrodes 18, 19 by known wiring provisions (not shown).

Figure 2:
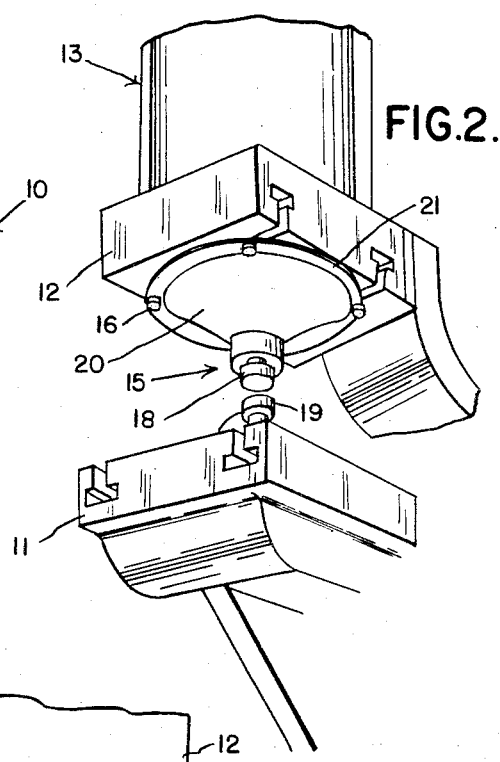
Fig. 2 is a fragmentary bottom perspective view in somewhat larger scale, more clearly illustrating the electrode holding structure, per se.
Figure 3:
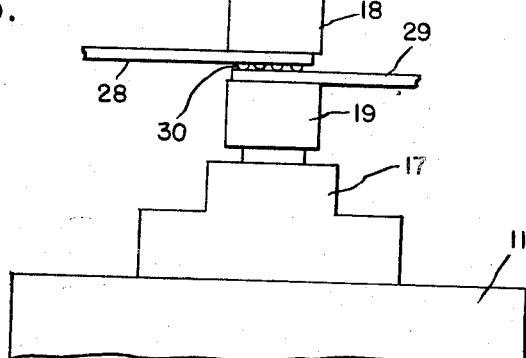
Fig. 3 is a fragmentary view in side elevation showing the equipment in operative relation to work being welded, the yielding of the spring-cushioned holder being indicated in dotted line.
Figure 4:
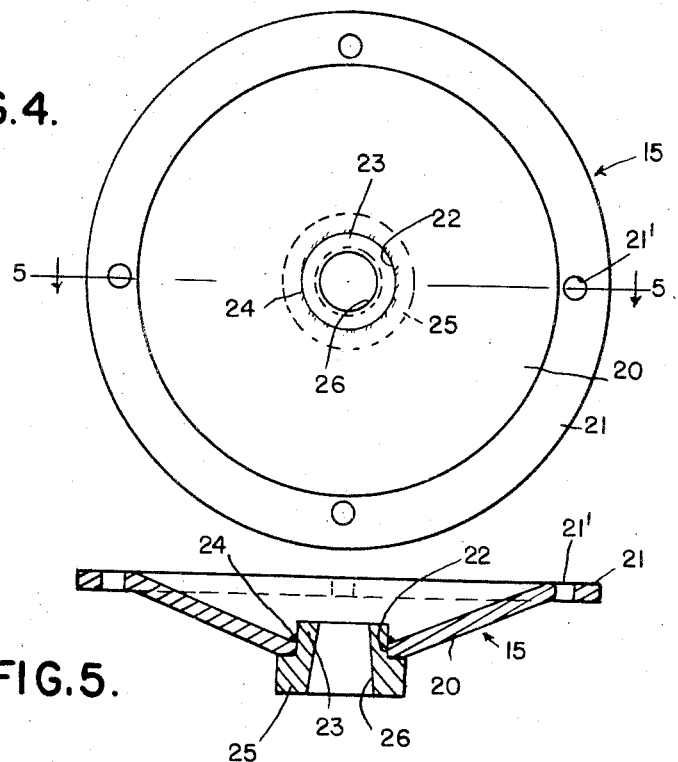
Fig. 4 is a top plan view of the conical electrode holder or adapter member in accordance with the embodiment of Figs. 1, 2 and 3.
Figure 5:
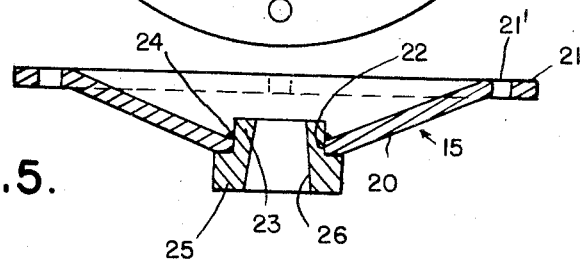
Fig. 5 is a view in axial section on line 5—5 of Fig. 4.

Referring now to Figs. 4 and 5, in conjunction with Figs. 1 through 3, the holder 15 takes the form of a generally conical (more precisely, frusto-conical) spring body 20 of mildly dished sectional outline, provided with an outer annular, horizontally disposed attaching flange 21, which has apertures 21' at circumferentially spaced points to receive the mounting bolts 16, or other securing means may be used.

The spring 20 is provided with a central opening 22 in which an annular electrode holder member 23 is snugly telescoped or force fitted, being further secured to the spring body 20 by silver brazing around the same at 24. The holder member 23 terminates in an enlarged annular head 25, and has a tapered central bore 26 which receives the electrode 18 and holds it frictionally in the manner of a fixed chuck. In the alternative, the spring 20 may be fabricated in other known ways, and may also be secured to the press member or electrode in other ways.

Conical spring body 20 may be fabricated of any suitable spring metal having desiredly high electrical conductivity, coupled with a suitably high modulus of elasticity, for example a beryllium-copper alloy, or other appropriate spring alloy of copper or other metal. It is essential that this metal be a good electrical conductor and that it have a degree of resilience such as will enable it to deflect substantially under initial and continued press head pressure (dotted line in Fig. 3), yet recover with sufficient force to follow the material welded, as the pair of superposed plates 28, 29 to be projection welded along a seam or like joint. Thus, holder 15 maintains a desired, substantially constant and uniform pressure as the metal of the work heats, softens and collapses.

Electrical connections to the holder or adapter 15 are effected in a conventional manner, as indicated above and as will be apparent to those skilled in the art; and suitable simple provision may be made to water-cool the holder.

Figure 6:
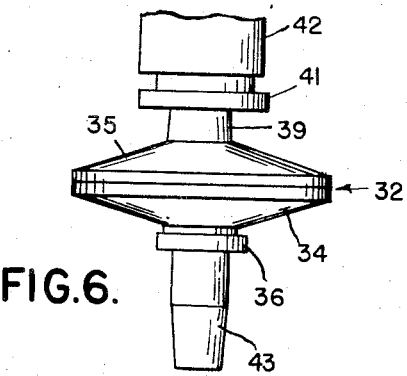
Fig. 6 is a fragmentary side elevation showing a further embodiment of the holder of the invention, as mounted to press structure.
Figure 7:
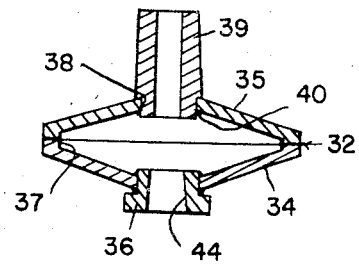
Fig. 7 is an axial section through the holder appearing in Fig. 6.

A modified adaptation of the principle of the invention appears in Figs. 6 and 7, in which the improved cushioned electrode holder is generally designated by the numeral 32. It consists of a lower, frusto-conical spring element 34, very similar to the spring body 20 of Figs. 1 through 5, and an identical upper spring element 35 in axial alignment therewith. The lower element has a tubular electrode holder member 36 fitted and brazed thereto in the fashion described previously.

Spring elements 34, 35 are of equal diameter and are integrally connected to one another, as by silver brazing at 37 about the mutually facing annular rim surfaces thereof. Element 35 has a centrally apertured apex 38 to receive a tubular, externally tapered mounting element 39, which may be joined to it by silver brazing at 40. Mounting element 39 is frictionally telescoped into a fixed chuck member 41 (Fig. 6) secured to the upper mount or head, which is in this case designated 42; and a spot welding electrode 43 is fitted in the conical chuck bore 44 of the lower holder element 36.

Figure 8:
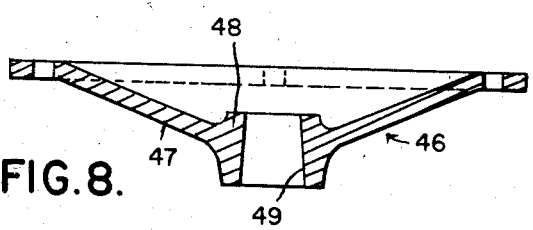
Fig. 8 is a view in axial section, similar to Fig. 5, through an integral or one-piece electrode holding spring in accordance with a modification of the invention.

Other variant forms or embodiments of the principle will occur to those skilled in the art. Thus, Fig. 8 illustrates a modified adaptation of the cushion spring concept, in which the spring unit, generally designated 46, is manufactured by a drawing or like operation as a single integral, one-piece unit comprising a generally frusto-conical spring body 47 having an axial electrode holder portion 48 as a projection thereof, this holder portion having a tapered electrode receiving bore 49. As in the case of the earlier forms, the spring-holder unit may be attached to a main mount or head in any suitable fashion; furthermore, the electrode may, if desired, be attached to the holder by threading, if this is desired.

In any of the embodiments of the invention, the conical spring or springs thereof are of relatively compact dimension in the axial sense, occupying a minimum of throat space between the relatively movable members of the welding machine. They are of adequately and substantially thick cross section to conduct electricity efficiently at a high amperage, as well as of stably transmitting a relatively heavy axial force. In thus transmitting force the material of the conical cross section is in compression between its axial, relatively apical zone and its outer peripheral zone, thus building up spring energy, distinguished from simple flexure. As the spring or springs are loaded towards a flat condition, the inner axial ends of the electrode holders 23 or 48 (in a single electrode type) or the holder 36 and mounting element 39 (of a dual electrode type) will bottom, the former against the head 12 or equivalent element, and the latter against one another to limit the compression of the material under maximum load.

Numerous advantages of the improvement, whether in the specific embodiments illustrated and above described, have been referred to but justify brief recapitulation.

The spring-cushioned adapter electrode body is obviously compact and of light weight, using little or no additional metal over and above what has heretofore been incorporated in conventional electrode holder devices. It is thus highly efficient in regard to material and space considerations or limitations; and the spring element is located as closely as possible to the welding electrode contact surface, so that minimum inertia need be overcome to achieve a fast follow-up.

That is, the energy stored up in the conical spring works, upon release, only against the slight inertia of the weld point, rather than the much larger inertia of the entire moving portion of the weld pressurizing structure. As a result, faster acceleration and faster follow-up of the contact surface permits a nearly uniform pressure through the welding cycle and a better and more efficient weld.

Improved performance is also made possible in regard to electrode life, with less maintenance cost, as well as in regard to the safety factor, due to a minimizing of arcing and consequent spitting.

The fact that the improvement allows for small deflection variations, without requiring that the work contact surfaces need be exactly parallel, has been mentioned above. Springs according to the invention can be designed to have a wide range of deflection with slight changes of load. The advantage of this adaptability is typified in the instance of a projection weld involving a number of widely spaced projections having non-uniform heights.

What I claim as my invention is:

1. A mount for an electrode of a resistance welding machine characterized by axially aligned and relatively movable pressure members, said mount comprising a generally conical spring fabricated of an electrically conductive metal in a cross section capable of efficiently conducting a high amperage potential, being of substantial and sufficient thickness to stably transmit a relatively heavy axial welding force with the material thereof under compression when the spring is compressed between said members, said spring having means to fixedly mount a welding electrode directly to the axial and relatively apical center zone thereof and in electrically conductive relation thereto, for the sole support of said electrode at said central zone, and having means acting between the outer peripheral zone of the spring and one of said pressure members in the mounting of said spring to said member, whereby said central zone and an electrode mounted thereto are movable axially relative to said last named pressure member under said compression.

2. A mount for an electrode of a resistance welding machine characterized by axially aligned and relatively movable pressure members, said mount comprising a generally conical spring fabricated of an electrically conductive metal in a cross section capable of efficiently conducting a high amperage potential, being of substantial and sufficient thickness to stably transmit a relatively heavy axial welding force with the material thereof under compression when the spring is compressed between said members, said spring having means to fixedly mount a welding electrode directly to the axial and relatively apical center zone thereof and in electrically conductive relation thereto, for the sole support of said electrode at said central zone, and having means acting between the outer peripheral zone of the spring and one of said pressure members in the mounting of said spring to said member, said last named means including means for securing said peripheral spring zone directly to said last named pressure member, whereby said central zone and an electrode mounted thereto are movable axially relative to said last named pressure member under said compression, said spring having means for bottoming engagement axially with said last named pressure member to limit said compression.

3. A mount for an electrode of a resistance welding machine characterized by axially aligned and relatively movable pressure members, said mount comprising a generally conical spring fabricated of an electrically conductive metal in a cross section capable of efficiently conducting a high amperage potential, being of substantial and sufficient thickness to stably transmit a relatively heavy axial welding force with the material thereof under compression when the spring is compressed between said members, said spring having means to fixedly mount a welding electrode directly to the axial and relatively apical center zone thereof and in electrically conductive relation thereto, for the sole support of said electrode at said central zone, and having means acting between the outer peripheral zone of the spring and one of said pressure members in the mounting of said spring to said member, said last named means including a mounting member secured to said spring at said peripheral zone and provided with means radially inwardly of said zone for fixed engagement with said last named pressure member, whereby said central zone and an electrode mounted thereto are movable axially relative to said mounting member and said last named pressure member under said compression.

4. A mount for an electrode of a resistance welding machine characterized by axially aligned and relatively movable pressure members, said mount comprising a spring formed of a pair of generally conical spring members each fabricated of an electrically conductive metal in a cross section capable of efficiently conducting a high amperage potential, being of substantial and sufficient thickness to stably transmit a relatively heavy axial welding force with the material thereof under compression when the spring is compressed between said pressure members, said spring members being axially aligned and directly and fixedly secured to one another in the outer peripheral zones thereof to constitute a unitary spring device, with the respective concavities thereof facing one another, one of said members having means to fixedly mount a welding electrode directly to the axial and relatively apical center zone thereof and in electrically conductive relation thereto, for the sole support of said electrode at said central zone, the other of said spring members having means at a corresponding central zone thereof to mount said spring on one of said pressure members, whereby said spring is bodily movable with said last named pressure member in accordance with the axial movement of the latter, the centers of said respective spring members being further movable axially relative to one another in transmitting axial force between said pressure members, said springs having means for bottoming engagement axially with one another to limit said compression.

5. A mount for an electrode of a resistance welding machine characterized by axially aligned and relatively movable pressure members, said mount comprising a spring formed of a pair of generally conical spring members each fabricated of an electrically conductive metal in a cross section capable of efficiently conducting a high amperage potential, being of substantial and sufficient thickness to stably transmit a relatively heavy axial welding force with the material thereof under compression when the spring is compressed between said pressure members, said spring members being axially aligned and directly and fixedly secured to one another in the outer peripheral zones thereof to constitute a unitary spring device, with the respective concavities thereof facing one another, one of said members having means to fixedly mount a welding electrode directly to the axial and relatively apical center zone thereof and in electrically conductive relation thereto, for the sole support of said electrode at said central zone, the other of said spring members having means in the form of an axially extending element at a corresponding central zone thereof to removably mount said spring on one of said pressure members, whereby said spring is bodily movable with said last named pressure member in accordance with the axial movement of the latter, the centers of said respective spring members being further movable axially relative to one another in transmitting axial force between said pressure members.

6. A mount for an electrode of a resistance welding machine characterized by axially aligned and relatively movable pressure members, said mount comprising a spring formed of a pair of generally conical spring members each fabricated of an electrically conductive metal in a cross section capable of efficiently conducting a high amperage potential, being of substantial and sufficient thickness to stably transmit a relatively heavy welding force with the material thereof under compression when the spring is compressed between said pressure members, said spring members being axially aligned and directly and fixedly secured to one another in the outer peripheral zones thereof to constitute a unitary spring device, with the respective concavities thereof facing one another, one of said members having means to fixedly mount a welding electrode directly to the axial and relatively apical center zone thereof and in electrically conductive relation thereto, for the sole support of said electrode at said central zone, the other of said spring members having means at a corresponding central zone thereof to mount said spring on one of said pressure members, whereby said spring is bodily movable with said last named pressure member at said central and peripheral zones in accordance with the axial movement of the latter, the centers of said respective spring members being further movable axially relative to one another in transmitting axial force between said pressure members.

7. A mount for an electrode of a resistance welding machine characterized by axially aligned and relatively movable pressure members, said mount comprising a spring formed of a pair of generally conical spring members each fabricated of an electrically conductive metal in a cross section capable of efficiently conducting a high amperage potential, being of substantial and sufficient thickness to stably transmit a relatively heavy axial welding force with the material thereof under compression when the spring is compressed between said pressure members, said spring members being axially aligned and directly and fixedly secured to one another in the outer peripheral zones thereof to constitute a unitary spring device, with the respective concavities thereof facing one another, one of said members having means to fixedly mount a welding electrode directly to the axial and relatively apical center zone thereof and in electrically conductive relation thereto, for the sole support of said electrode at said central zone, the other of said spring members having means in the form of an axially extending element at a corresponding central zone therof to removably mount said spring on one of said pressure members, whereby said spring is bodily movable with said last named pressure member at said central and peripheral zones in accordance with the axial movement of the latter, the centers of said respective spring members being further movable axially relative to one another in transmitting axial force between said pressure members.

8. A mount for supporting an electrode for a resistance welding machine coaxially between relatively movable press and platen members of said machine, said mount comprising a spring of generally conical cross section and of a relatively flat and compact dimension in the direction of its axis, said mount having means to secure the same to one of said members and means to secure a welding electrode directly and in electrically conductive relation thereto at the inner axial zone thereof, said spring being fabricated of an electrically conductive metal in a relatively thick cross section capable of efficiently conducting a high amperage potential and of stably transmitting a relatively heavy axial welding force, with the material thereof under compression, when the spring is compressed between said members.

9. A mount in accordance with claim 8 in which said electrode securing means of said mount is disposed at the central, relatively apical zone of said spring.

10. A mount in accordance with claim 8, in which said first named securing means is disposed adjacent the outer periphery of said conical spring, in substantially spaced relation to said inner axial zone, by which means said spring is secured in flatwise engagement with one of said members, and in which said electrode securing means of said mount is disposed at the central, relatively apical zone of said spring.

11. A mount in accordance with claim 8 in which said electrode securing means of said mount is disposed at the central, relatively apical zone of said spring, and in which said first named securing means comprises a further conical spring similar to the first named spring and marginally secured to the outer periphery of the latter, said further spring having means at the central, relatively apical zone thereof to secure the same to one of said members.

References Cited in the file of this patent

UNITED STATES PATENTS

| | | |
|---|---|---|
| 2,412,044 | Hansen | Dec. 3, 1946 |
| 2,452,010 | Woodward | Oct. 19, 1948 |
| 2,561,486 | Thibaudat | July 24, 1951 |
| 2,654,256 | McKechnie | Oct. 6, 1953 |
| 2,810,062 | Kaunitz | Oct. 15, 1957 |

FOREIGN PATENTS

| | | |
|---|---|---|
| 336,825 | Germany | Mar. 30, 1922 |